June 2, 1925.
F. CAIN
VALVE
Filed Feb. 28, 1924
1,540,539
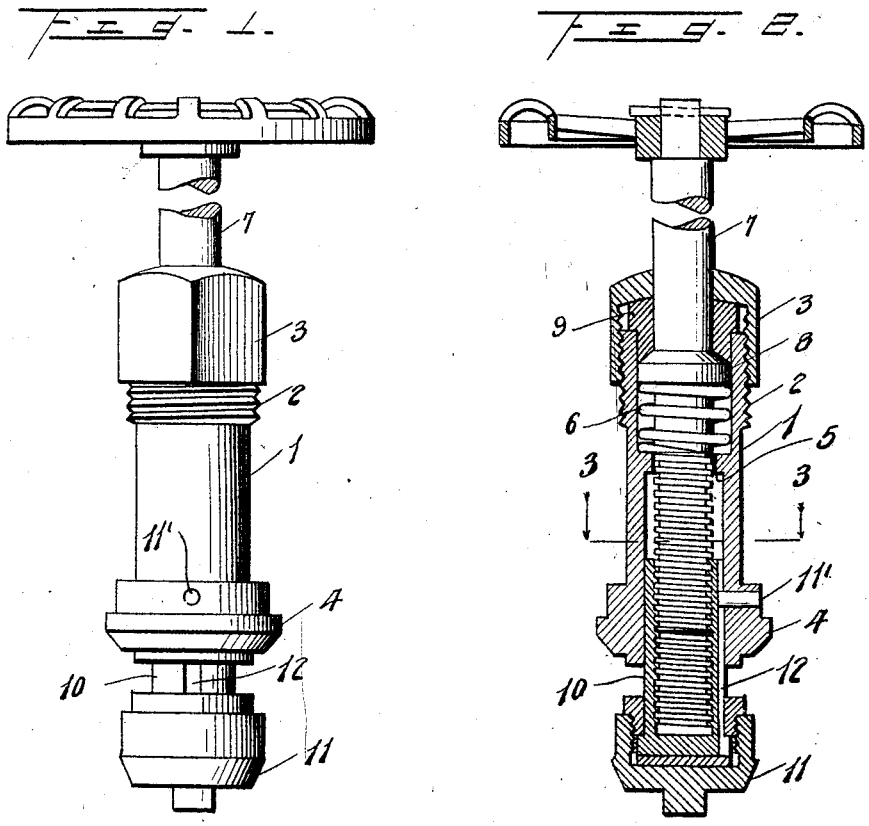
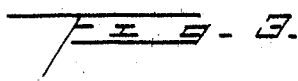
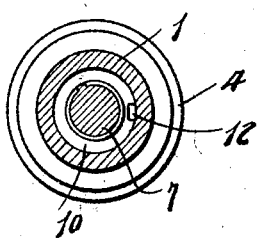
Inventor
F. Cain.
By A. Randulph Jr.
Attorney Patented June 2, 1925.

1,540,539

UNITED STATES PATENT OFFICE.

FRANK CAIN, OF TYLER, TEXAS, ASSIGNOR OF ONE-THIRD TO CHAS. J. BROGAN AND JOHN H. BROGAN AND ONE-THIRD TO LOYD H. CAIN, ALL OF TYLER, TEXAS.

VALVE.

Application filed February 28, 1924. Serial No. 695,796.

*To all whom it may concern:*

Be it known that I, FRANK CAIN, a citizen of the United States, residing at Tyler, in the county of Smith and State of Texas, have invented certain new and useful Improvements in Valves; and I do hereby declare the following to be a full, clear, and exact description of the invention, such as will enable others skilled in the art to which it appertains to make and use the same.

The present invention has for its object the provision of a valve stem for use in connection with globe valves and all valves in locomotive cabs and which obviates the scraping of valve bonnets and eliminates the packing of valve stems every few days, soft packing being dispensed with and direct thread connection between the operating stem and bonnet being overcome.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor detils of construction may be resorted to without departing from the spirit of the invention.

Referring to the accompanying drawings forming a part of the application:

Figure 1 is an elevational view of a valve stem embodying the invention,

Figure 2 is a central longitudinal sectional view thereof, and

Figure 3 is a sectional view on the line 3—3 of Figure 2.

Corresponding and like parts are referred to in the following description and designated in the several views of the drawings by like reference characters.

The numeral 1 designates the bonnet, such as usually provided for globe valves, said bonnet being of elongated tubular form and having an externally threaded enlargement 2 at one end to receive the usual nut 3 and provided at its opposite end with an annular enlargement 4 which is adapted to engage the valve casing or like part (not shown). An inner annular shoulder 5 is provided intermediate the ends of the bonnet 1 and sustains the end thrust of a helical spring 6 mounted upon an operating stem 7 and engaging an annular enlargement 8 thereof, whereby to normally urge the stem toward the outer end of the bonnet and hold the enlargement 8 in contact with a metal packing 9 which is flanged at its upper end and confined between the nut 3 and the outer end of the bonnet 1. In this manner a close joint is maintained between the operating stem and the bonnet. The meeting faces of the annular enlargement 8 and the packing 9 are of conical or tapering formation to insure a close joint. The inner shoulder 5, besides forming an abutment for the spring 6, provides a guide for the operating stem 7, the lower portion of which is provided with a left screw thread to match a corresponding thread formed within a sleeve 10 which constitutes a tubular or hollow stem of a valve 11, which is connected to the lower end thereof by means of a swivel joint so as to insure a firm seating of the valve without any grinding action.

From the foregoing, taken in connection with the accompanying drawings, it will be understood that the valve stem may be applied to any globe valve or valve casing and that the same is free from soft packing and in consequence does not require frequent replacement. Moreover, there is no direct screw thread connection between the operating stem and the stem of the valve 11, hence scraping on the bonnet is obviated. It is observed that the hollow stem 10 obtains a snug fit within the bonnet 1 and is prevented from turning by means of a pin 11' projecting inwardly from the enlargement 4 of the bonnet and a longitudinal groove 12 in the outer side of the stem 10 in which the projecting end of the pin 11' operates.

What is claimed is:

A valve structure comprising a bonnet of elongated tubular form having an inner flange integral therewith intermediate its ends providing an annular shoulder, the lower end of the bonnet being laterally enlarged to provide a bevelled seat for engagement with a casing, a valve having a tubular stem slidable within the bonnet and provided with an exterior longitudinal groove, a pin carried by the enlargement and extending into said groove to prevent rotation of the tubular stem, an operating stem guided by said flange and having screw thread connection with the tubular stem, said operating stem having an annular enlargement integral with it, a helical spring surrounding the operating stem and confined between said enlargement and said shoulder, a metal packing snugly fitting within the outer end of the bonnet and engaging said enlargement, a flange on the packing overlapping the outer end of the bonnet, and a nut engaging the last mentioned flange to secure the packing to the bonnet.

In testimony whereof I affix my signature in presence of two witnesses.

FRANK CAIN.

Witnesses:
R. L. GASTON,
C. J. BROGAN.